Nov. 9, 1965   R. GROSCLAUDE ETAL   3,216,176
APPARATUS FOR THE FABRICATION OF CONTAINERS
MADE FROM PLASTIC MATERIAL
Filed Jan. 31, 1962   10 Sheets-Sheet 2
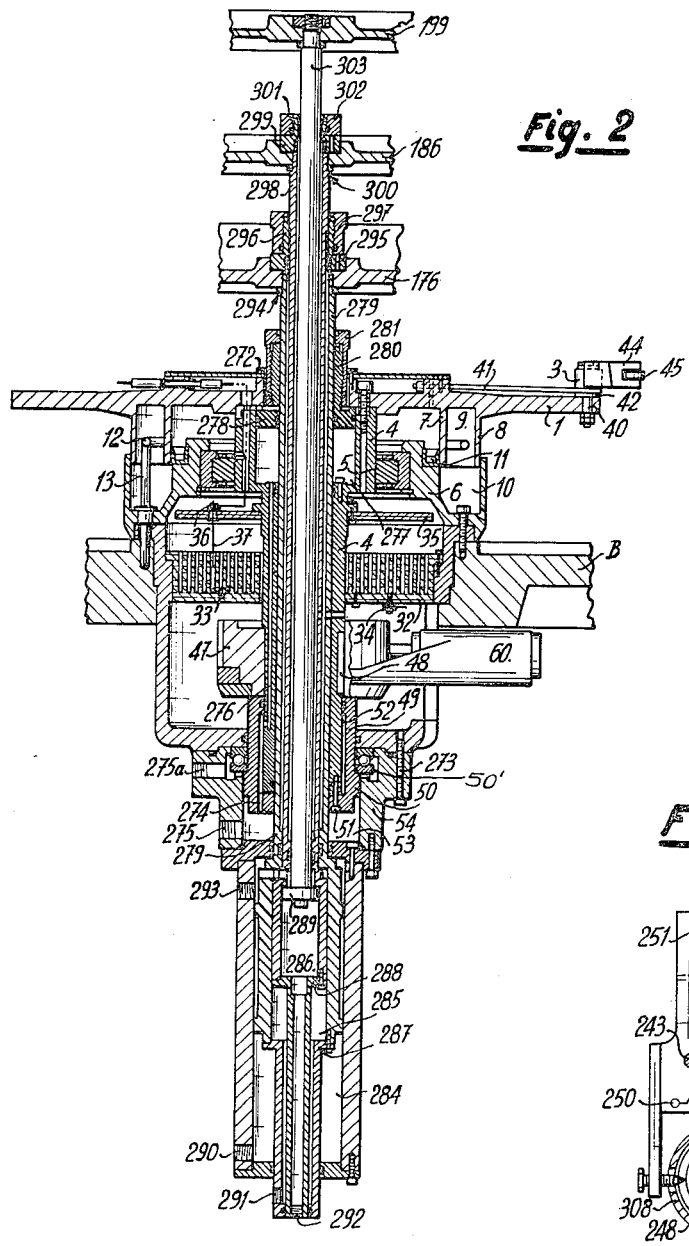
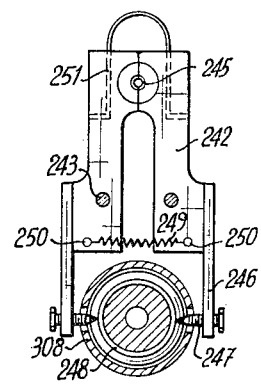
INVENTORS
RENE GROSCLAUDE
PIERRE ANDREY
By Irwin S. Thompson
ATTY.

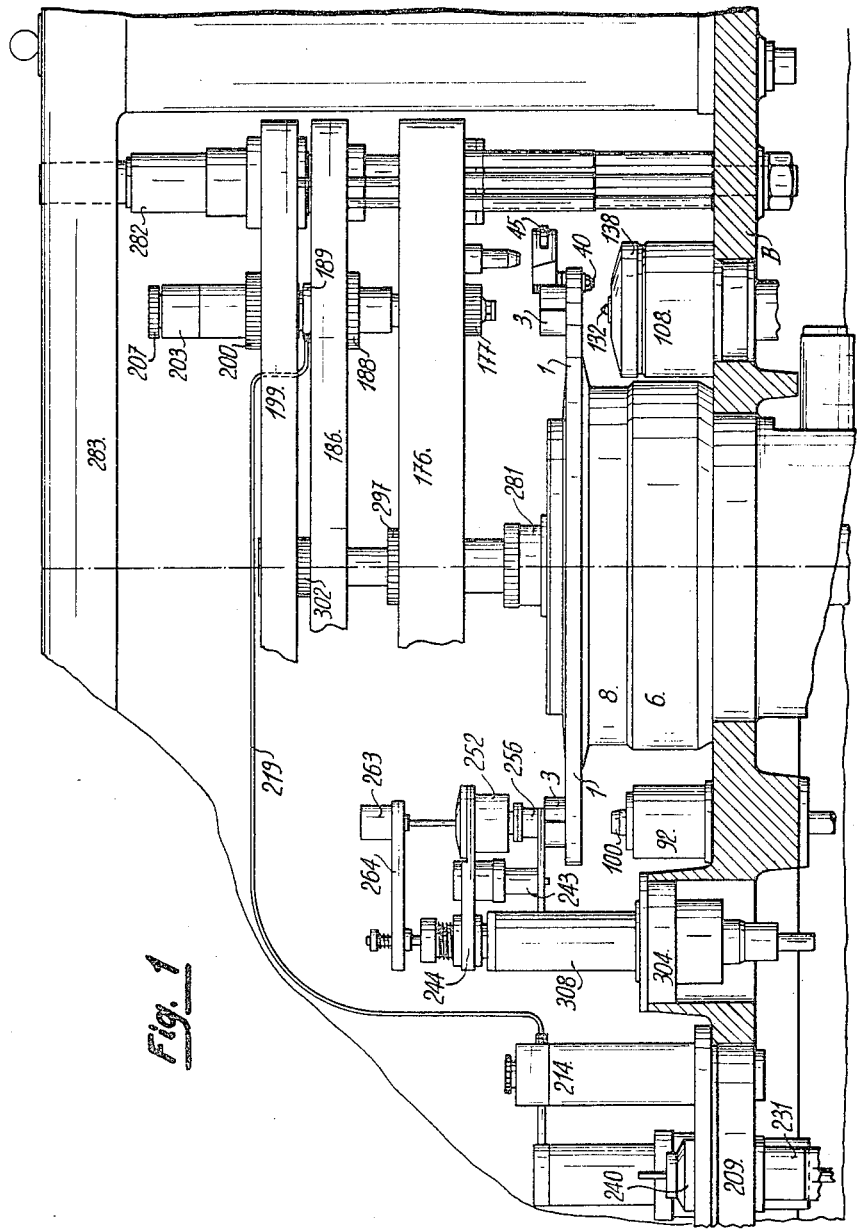

Nov. 9, 1965
R. GROSCLAUDE ETAL  3,216,176
APPARATUS FOR THE FABRICATION OF CONTAINERS
MADE FROM PLASTIC MATERIAL
Filed Jan. 31, 1962
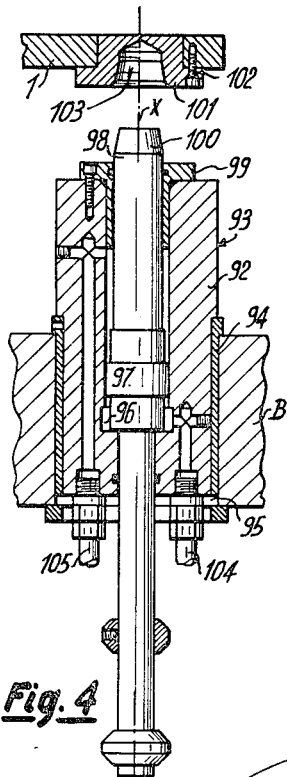
Fig. 4
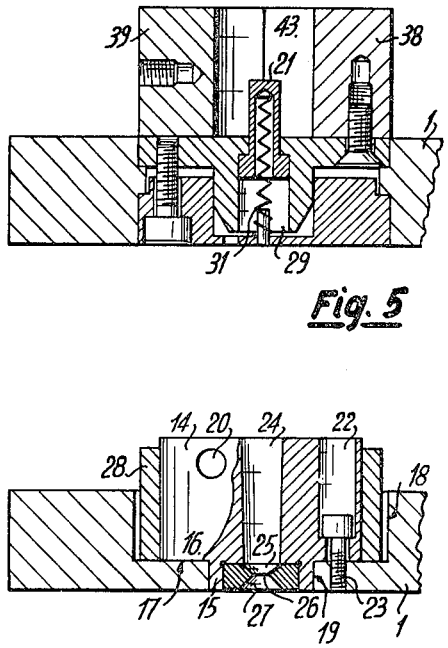
Fig. 5
Fig. 6
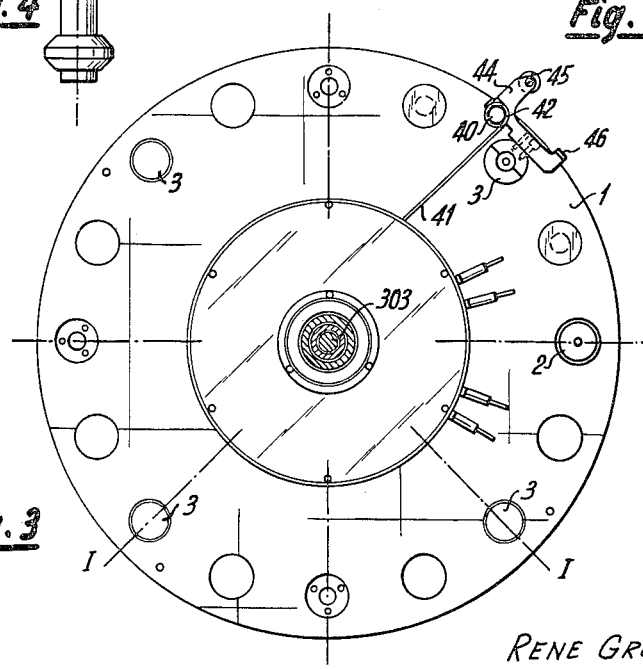
Fig. 3
INVENTORS
RENE GROSCLAUDE
PIERRE ANDREY
BY Irwin S. Thompson
ATTY.

Nov. 9, 1965  R. GROSCLAUDE ETAL  3,216,176
APPARATUS FOR THE FABRICATION OF CONTAINERS
MADE FROM PLASTIC MATERIAL
Filed Jan. 31, 1962  10 Sheets-Sheet 4
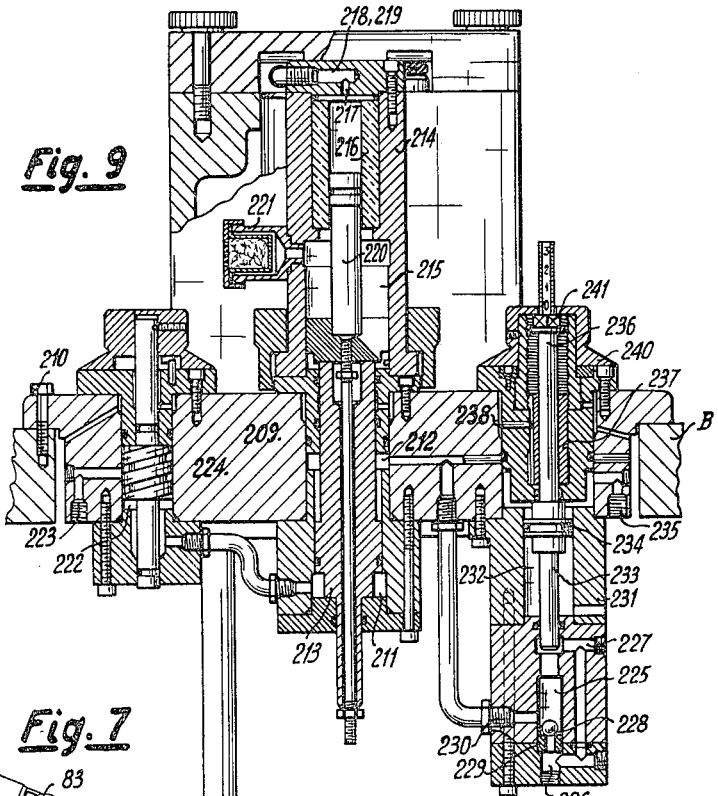
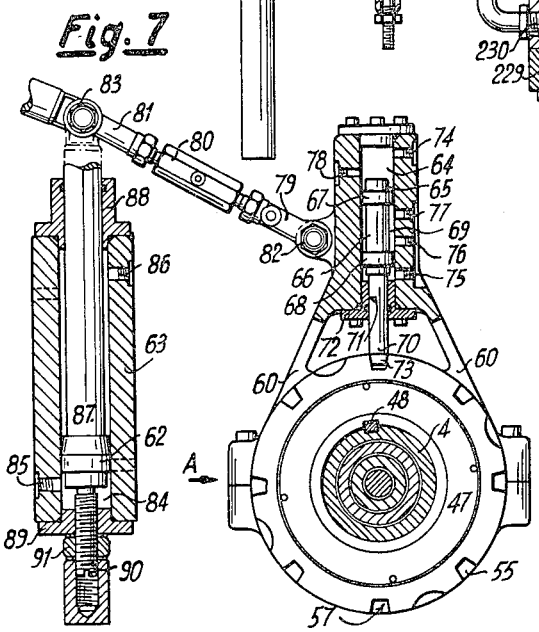
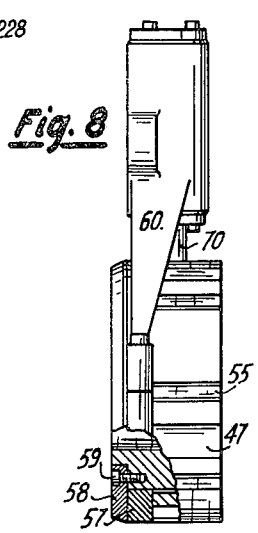
INVENTORS
RENE GROSCLAUDE
PIERRE ANDREY
BY Irwin S. Thompson
ATTY.

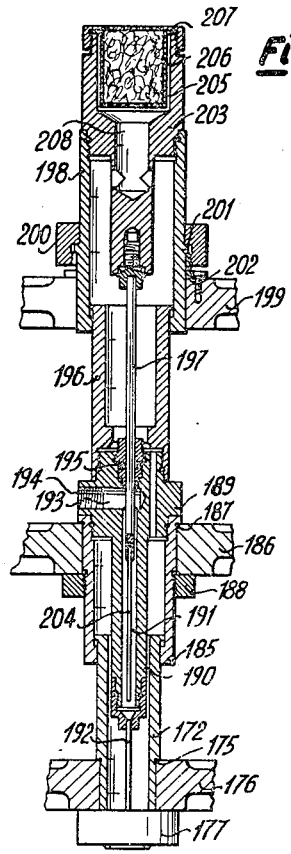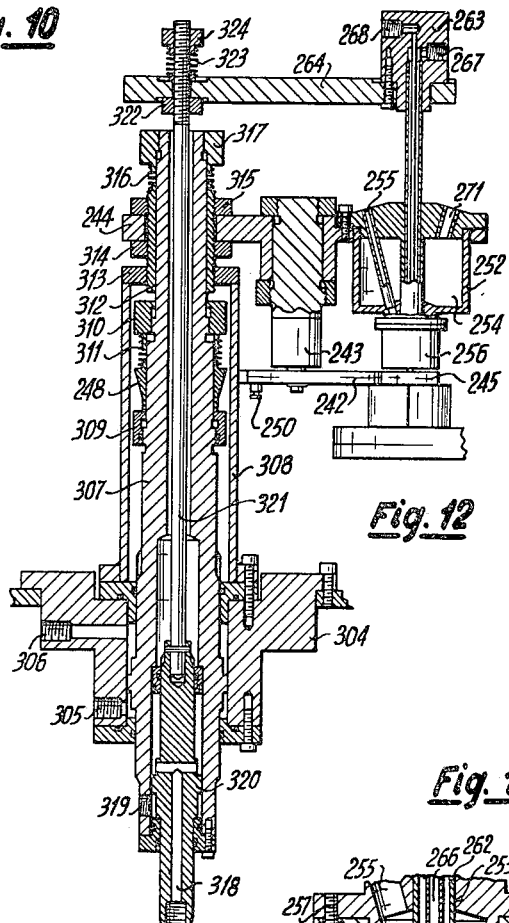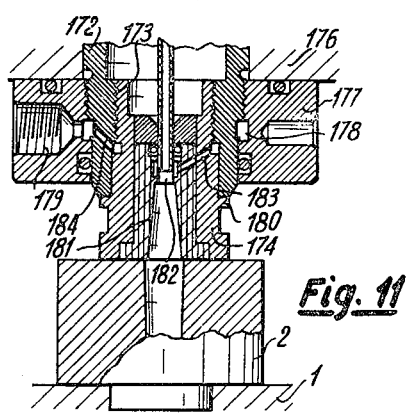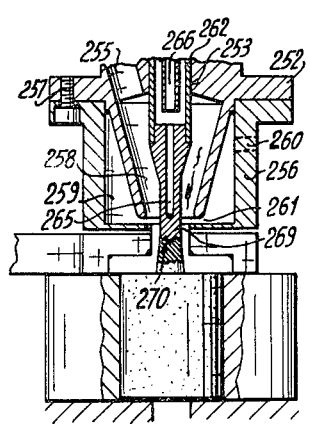
INVENTOR
RENE GROSCLAUDE
PIERRE ANDREY
BY Irwin S. Thompson
ATTORNEY

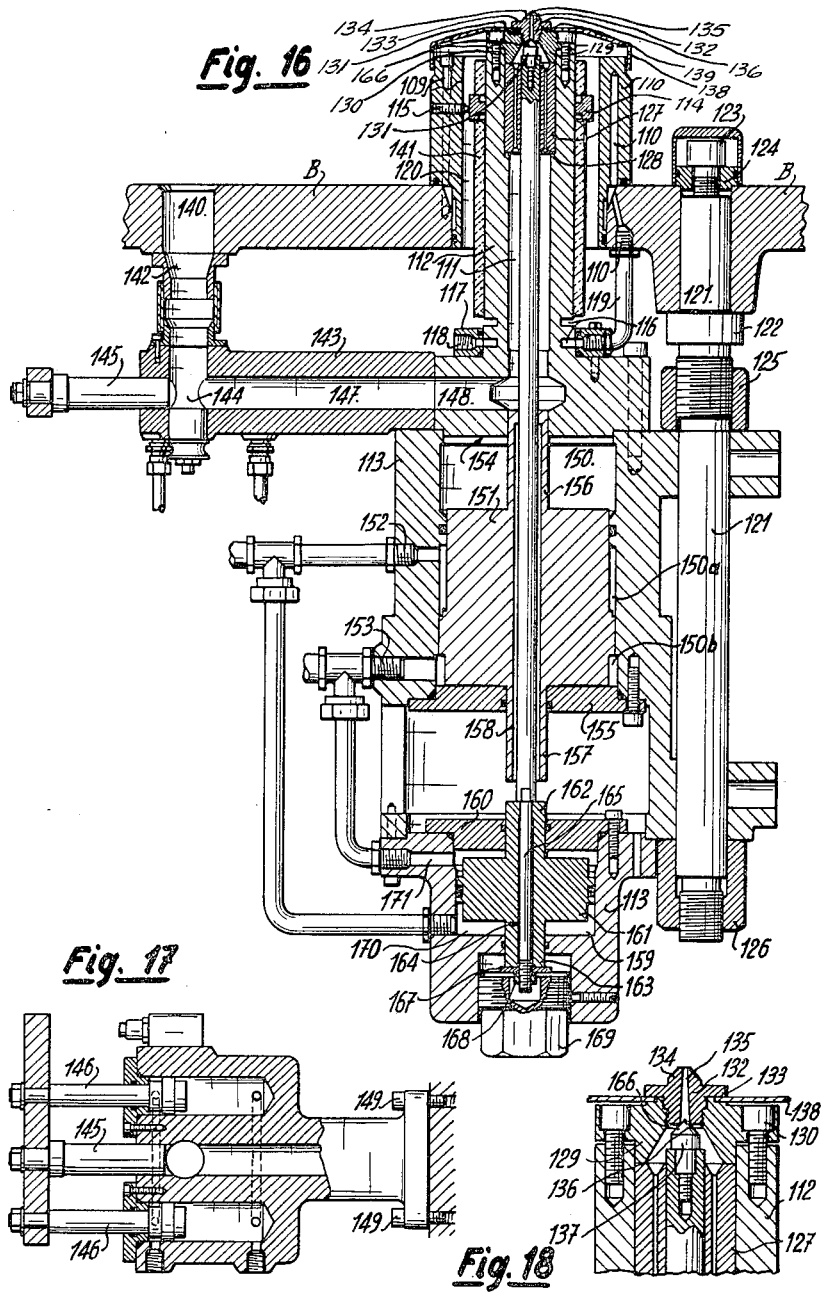

INVENTORS:
RENE GROSCLAUDE
PIERRE ANDREY
BY Irwin S. Thompson
ATTY.

United States Patent Office 3,216,176
Patented Nov. 9, 1965

3,216,176
APPARATUS FOR THE FABRICATION OF CONTAINERS MADE FROM PLASTIC MATERIAL
René Grosclaude and Pierre Andrey, Geneva, Switzerland, assignors to Laboratoires Vifor S.A., Geneva, Switzerland, a corporation of Switzerland
Filed Jan. 31, 1962, Ser. No. 170,108
Claims priority, application Switzerland, May 18, 1961, 5,800/61
11 Claims. (Cl. 53—191)

The present invention has for its object an installation for the fabrication of containers made from plastic material by expansion of the plastic material by injection therein of a fluid to be contained in the container and which comprises at least one mould made in two parts which receives the plastic material and a forming mould made in two parts, an injection device for the plastic material, an injection device for injecting the fluid into the plastic material, and a sealing device for the container filled with fluid a first part of each plastic receiving mould and of each forming mould is mounted on a transfer device which is displaceable step by step. The mould parts are uniformly and alternatively distributed on a path parallel to the displacement of the transfer device. The fluid injection device is sterile and comprises an axially displaceable head provided with an injection needle, constituting the second part or cover of the plastic receiving mould during the injection of plastic material therein, the injection needle being closed by a mandrel. Said head constitutes also the second part or cover of the forming mould during the expansion of the moulded mass of plastic material and the blowing up of the container through its filling by means of the injection needle. The said head of the liquid injection device constitutes further a carrying member carrying the mass of plastic material during the displacement of the transfer device, this head being in a retracted position for which the mass of plastic material is situated out of the path of the moulds carried by the transfer device. The formed and filled container is maintained in said first part of the finishing mould during a subsequent displacement of the transfer device bringing said container in alignment with the sealing device, then said container is ejected after its sealing, out of said first part of the mould, by an ejection device of the container. This ejection device is actuated by a subsequent displacement of the transfer device which brings the first part of the plastic receiving mould in the plastic injection position.

The annexed drawing shows schematically and by way of example one embodiment of an apparatus according to the invention.

FIG. 1 is a general view of the apparatus partially in section along line I—I of FIG. 3.

FIG. 2 is a cross sectional view of the actuating device.

FIG. 3 is a plan view of the table of the transfer device.

FIG. 4 is a cross sectional view of the device for locking the angular position of the table.

FIG. 5 is a view in cross section of a forming mould.

FIG. 6 is a view in cross section of a plastic receiving mould.

FIG. 7 is a plan view partially in section of the device for rotating the table.

FIG. 8 is a view from A of FIG. 7, certain parts being in section and others being not represented.

FIG. 9 is a section of the pumping and pressure device of the fluid.

FIG. 10 is a view in cross section of the fluid injection device.

FIG. 11 is a view in cross section, at a greater scale, of a detail of the fluid injection device.

FIG. 12 is a view in cross section of the first embodiment of the sealing device.

FIG. 13 is a view in cross section, at greater scale, of a detail of the sealing device illustrated at FIG. 12.

FIG. 14 is a plan view, partially in section, of the sealing device illustrated at FIG. 12.

FIG. 16 is a view in cross section of the plastic injection device.

FIG. 17 is a plan view, partially in section, of the feed device of the plastic material.

FIG. 18 is a view in cross section, at greater scale, of the front part of the injection pot.

Figure 19:
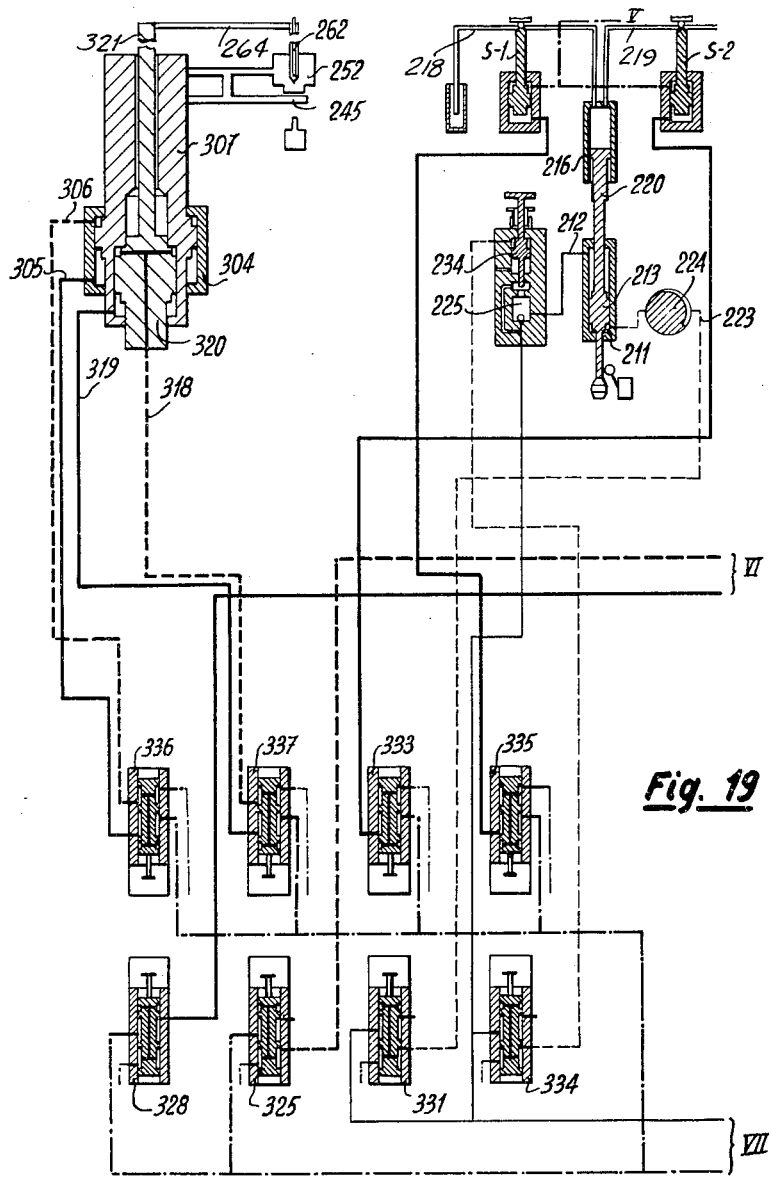
Figure 20:
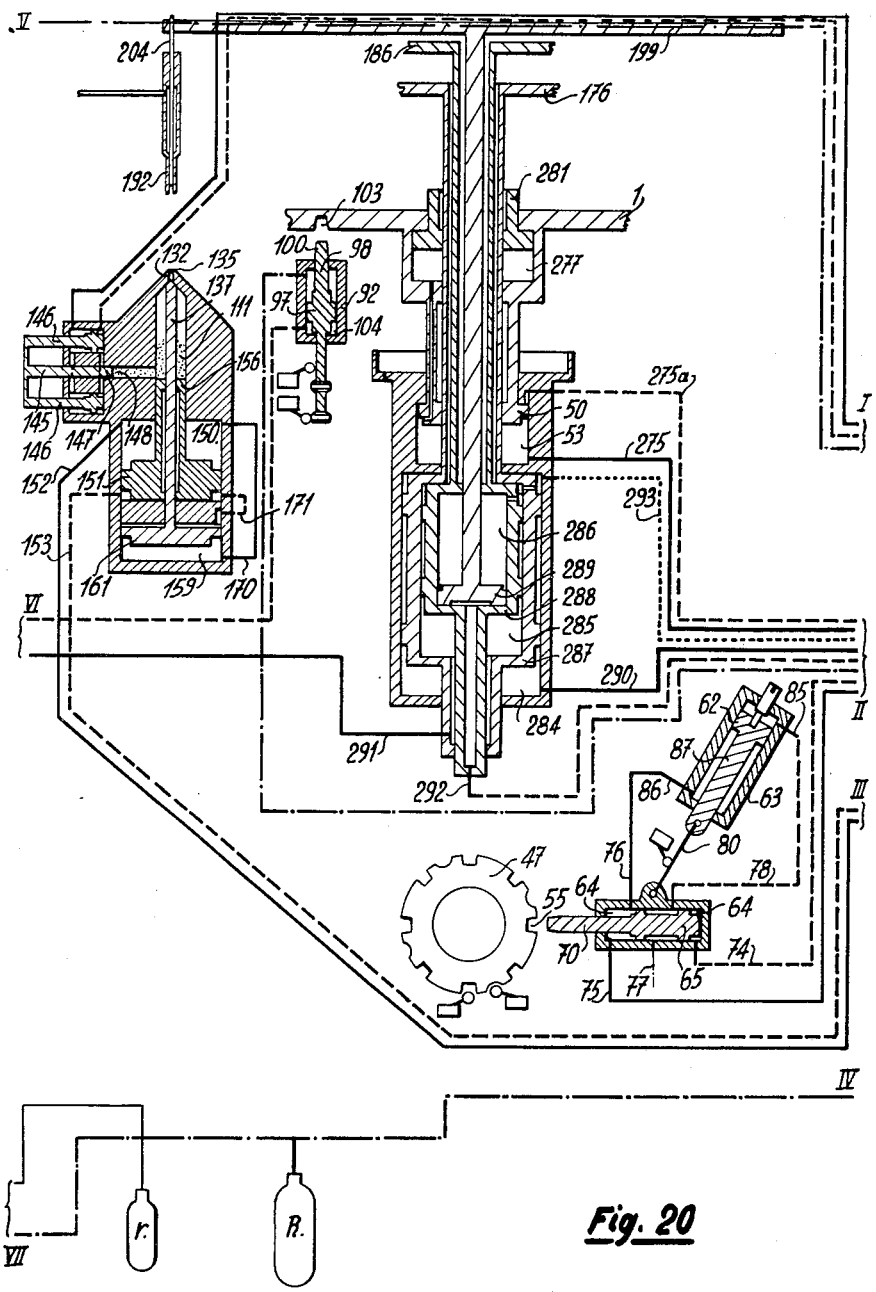
Figure 21:
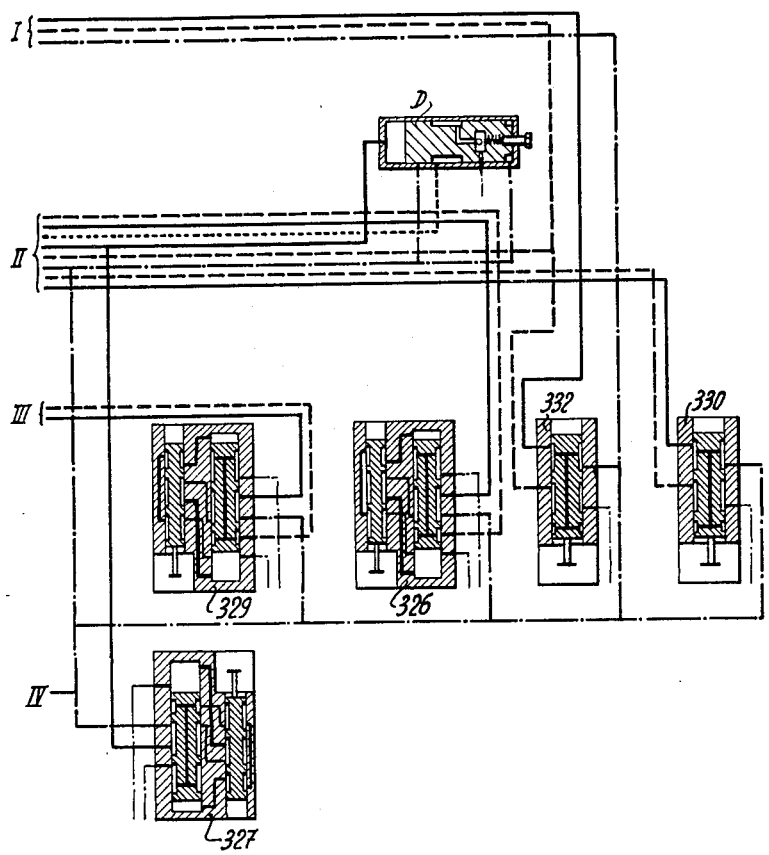

The FIGS. 19, 20 and 21 illustrate a hydromechanical schematic diagram of the control of the different members of the apparatus for manufacturing containers made of plastic material.

The manufacturing apparatus for making a plastic material container according to the invention comprises a mould transfer device; a driving device for driving the transfer device in intermittent rotation; a plastic material injection device; a fluid injection device for injecting fluid into the injected plastic material to form the container in forming device, a sealing or closing device of the formed and filled container as well as an actuating device for providing the vertical displacements of the transfer device, of the fluid injection device and of the sealing device.

The mould transfer device comprises a table 1 carrying at least a first part of a plastic receiving mould 2 and also at least a first part of a forming mould 3. This table 1 is mounted on a hollow shaft 4 journaled by means of a roller bearing 5 or a support 6 fixed on the frame B of the machine. This roller bearing enables a rotation of the hollow shaft 4 as well as an axial displacement thereof with respect to the support 6.

The table 1 comprises on its lower surface two circular walls 7, 8 forming with the said table a circular groove 9 presenting in transverse cross section the general shape of an inverted U. The free extremity of these walls 7, 8 is engaged in a circular housing 10 presenting in cross section the general shape of a U provided in the support 6. A gasket 11 ensures an absolutely tight connection between the wall 7 of the table 1 and the support 6. This gasket 11 presents in transverse cross section the general shape of a U one leg of which rests on the free extremity of the wall 7 whereas its other leg and bottom rest on the support 6. The circular groove formed by gasket 11 is filled with thick oil enabling, on the one hand, to improve the tightness of the joint, and on the other hand, to reduce the friction and the wear of the parts of the gasket 11 which are in contact with the wall 7.

A spraying device for cooling the table 1 is constituted by a circular tube 12 housed inside the circular groove 9 pierced in direction of the bottom of said groove 9 by holes uniformly distributed on the whole periphery. In this circular tube 12 is fed a cooling fluid, which is generally water, by a tube 13 traversing the housing 10 and traversing the support 6 through the bottom of said housing.

The first part of each plastic receiving mould 2 as shown in FIG. 6 is constituted by a cylindrical body 14 comprising one part of small diameter 15 and one part of the greater diameter 16 defining a shoulder 17. The part 16 of greater diameter is situated in working position in an opening 18 provided in the table 1 whereas the part 15 is engaged in a bore 19 provided in the bottom of table 1. The bottom surface of the part 15 is, when in working position, flush with the lower surface of the table 1. A bore 20 provided in the body 14 receives a gauge measuring the temperature of the mould. This body 14 is further provided with bores 22 giving passage to fixing members 23 such as bolts or other suitable means for maintaining this mould 2 on the table 1.

This first part of each plastic receiving mould comprises at least one cavity 24, of generally conical shape, co-axial to the body 14. Its great base is located in the plane of the top surface of the part 16 of the body 14. This cavity 24 communicates with an inner tapered section 25' of a terminal part 25. Terminal part 25 also has an outer conical section 27 to receive a plastic injection nozzle.

Between sections 25' and 27 there is an opening 26 to allow the plastic material to enter cavity 24 therethrough.

Each plastic receiving mould 2 is provided with a heating member 28 to maintain the mould at the desired temperature, determined by the nature of the plastic material. Perforations provided in the table 1 reduce the thermal conductivity thereof so as to avoid too great a heat loss which would lead to great energy consumption for the heating of the moulds.

The heating members 28 as well as the gauges disposed in bores 20 are electrically connected to feeding plugs, rigidly fixed to the frame of the apparatus, through the intermediary of a connecting device ensuring the electrical connection between the mobile table 1 and the stable frame.

This connecting device comprises a box 32 made of insulating material comprising concentric circular grooves 33, filled with mercury, as electrical conductors. Said box 32 is rigidly fixed on the frame B of the apparatus. Connecting plugs 34 fixed on the lower surface of the box 32 are electrically connected to the different circular grooves 33 respectively. This connecting device comprises further a disc 35 also made of insulating material, rigidly fixed on the hollow shaft 4. This disc 35 carries connecting plugs 36 which are electrically connected to the gauges and heating members 28 respectively. Each of these connecting plugs 36 carries a plunger 37 traversing the disc 35 and dipping in one of the grooves 33 of the box 32. It is thus possible, by means of this connecting device, to electrically connect each plug 34 to the corresponding plug 36 while enabling angular as well as axial displacements of the disc 35 and the table 1, with respect to the box 32 and the frame B of the apparatus.

The first part of each forming mould 3 (see FIG. 5) is constituted by two halves; the one 38 is rigidly fixed on the table 1 and the other 39 is pivoted around an axis 40 with respect to the said table 1. The two halves of the first part of the mould 3 are maintained against each other by means of a spring traction device constituted by spring means 41 one extremity of which is fixed on the table 1 whereas the other is wound around and fixed on a pulley 42 concentric to the pivoting axis 40 and fast to the mobile half 39 of the mould 3.

The first part of the forming mould 3 comprises a cavity 43 the shape of which corresponds to the shape that one desires to give to the body of the container. The mobile part 39 of the first part of the mould 3 is further provided with a lever 44 integral with pulley 42 and having an arm 44' the free extremity of which has a roller 45 pivotally mounted thereon. Lever 44 is also provided with a locking arm 46 which is connected to mobile half 39. The junction surface of the two halves of the first part of the mould 3 is located in a plane perpendicular to a radius of the said table passing through the axis of the cavity 43 of the first part of the mould 3.

In the example shown, each forming mould 3 comprises further a mobile bottom constituted by a stud 21 sliding in a housing 29 provided in the bottom of the forming mould. Stud 21 is subjected to the action of a spring 31 tending to maintain this stud in an upper position, that is to say, in which it extends inside the cavity 43 of the mould through an opening in the bottom thereof.

The step by step driving device of the transfer device as shown in FIGS. 2, 7 and 8 comprises a driving ring 47 angularly fast with the hollow shaft 4 by means of a pin 48. Ring 47 engages and rests on the upper extremity of the skirt 49 of a piston 50 which is rigidly fixed by means of screws 51 on the lower extremity of the hollow shaft 4. The skirt 49 surrounds the hollow shaft 4 and defines a chamber 52 therebetween. This piston 50 is pivoted, through the intermediary of a ball bearing assembly 50', with respect to the frame of the apparatus and moves axially in a bore 53 provided in a one effect jack 54 fast on the frame B. Ring 47 comprises on its outer surface ratching grooves 55 parallel to the revolution axis of the ring. In its lower part this ring 47 presents a machined cylindrical outer surface concentric to the hollow shaft 4. An annular member 57 is adjusted on said surface so as to be able to revolve freely but without clearance on said surface. An axial abutment 58, fixed by screws 59 on the member 47, maintains the member 57 in its axial position with respect to the said member 47. The ring 57 is rigidly connected by means of two arms 60 to a ratching device. This ratching device is mechanically connected to a driving device comprising a piston 62 disposed in a cylinder 63.

This ratching device comprises a cylinder 64 inside which moves a piston 65. This piston 65 comprises a body 66 provided with two shoulders 67 and 68 presenting diameters corresponding to the inside diameter of the cylinder 64 and defining a chamber 69 in the cylinder 64 which is axially displaceable according to the movements of the piston 65. This piston 65 is further provided at one of its extremities with a locking member 70 sliding in a bore 71 provided in a frontal part 72 constituting one of the end walls of the cylinder 64. Locking member 70 comprises a conical part 73 at its outer extremity, which cooperates with each of the ratching grooves 55 successively. The cylinder 64 comprises holes 74, 75 to give passage to the fluid for actuating the piston 65. Further the cylinder is provided with three holes 76, 77 and 78. The holes 74, 75 are alternatively connected through the intermediary of a valve to a supply of the fluid under pressure or to a discharge duct giving access to a fluid reservoir as described hereinafter. The mechanical linkage connecting the ratching device to the piston 62 of the cylinder 63 is constituted by two rods 79, 81 threaded at one of their extremities in inverse direction the one from the other and connected at their other extremities respectively to the ratching device and to the piston 62 of the cylinder through the intermediary of a socket joint 82, 83. These two rods 79, 81 are screwed in a sleeve 80. In this way it is possible to vary the length of this mechanical linkage through simple rotation of the sleeve 80.

The cylinder 63 comprises a chamber 84 which has two holes 85, 86 giving passage to fluid actuating the piston 62 sliding freely but without clearance in the said chamber 84. These holes are connected through ducts to the holes 78, 76 respectively of the ratchet device (see FIG. 20). The hole 77 of the ratching device is connected through a discharge duct to a reservoir of fluid. The direction of displacement of the piston 62 of the driving cylinder 63 depends upon the position of locking member 70 of the ratchet device.

In order for the piston 62 to be actuated from its rest, retracted position to its end stroke, fore or ratched in position, and in order for the piston 62 to be actuated from its fore position to its retracted or rest position, locking member 70 has to be in retracted position.

The rod 87 of the piston 62 is guided in a frontal part 88 forming one of the end walls of cylinder 63. The other end wall of cylinder 63 is formed by a cover 89 comprising an adjustable axial abutment constituted by a screw 90 which is fixed in its working position, defining the desired stroke of the piston 62, by means of a counter nut 91. The frontal part 88 as well as the cover 89 of the cylinder are fixed thereon by any conventional means.

FIG. 4 shows a locking device for locking table 1 at predetermined angular positions. This locking device comprises a body 92 of cylindrical shape and the outside surface 93 of which is cylindrical of revolution but eccentric with respect to the axis x of said body 92. Said body 92 is situated inside a sleeve 94 disposed inside a bore 95 provided in the frame B of the apparatus. This sleeve has internal and external surfaces which are cylindrical of revolution but eccentric the one with respect to the other. Due to the body 92 and to the sleeve 94 both being eccentric, it is possible to displace the axis x of the body inside a given circular surface. The body 92 encloses a cylinder 96 which is cylindrical of revolution centered on the axis x of said body. A piston 97 slides without clearance in the cylinder 96. This piston 97 carries a locking projection 98 guided in a frontal part 99 forming the frontal wall of the cylinder 96 fixed on the body 92. The outer extremity 100 of locking porjection 98 is conical and cooperates with members 101 disposed in the bores provided in the table 1 and fixed by means of tightening means 102 on the lower surface of said table 1. These members 101 comprise a conical shaped depression 103 corresponding to the extremity 100 of the locking projection.

The cylinder 96 comprises two openings 104, 105 giving passage to the fluid actuating the piston 97, connected by means of a valve to the reservoir of fluid under pressure and to the discharge alternatively as described hereinafter.

The plastic material injection device shown in FIG. 16 comprises an injection pot, a plastic feeding device supplying plastic to the injection pot and a device for pressurizing the plastic material contained in the injection pot as well as a device for closing the outlet of the plastic material to be injected.

The injection pot comprises a member 108 of generally tubular form rigidly fixed on the frame of the machine B by means of tightening members 109. The member 108 is provided with a cooling circuit 110. This injection pot comprises further an injection duct 111 constituted by a hole provided in a piece 112. The bottom surface of said piece 112 is rigidly fixed on an auxiliary frame 113 of the pressurizing device.

The upper part of this piece 112 is engaged in a centering ring 114 the position of which with respect to the member 108 is fixed by three screws 115 screwed in the said member 108 and resting on the external surface of said centering ring 114. It is thus easy to place the axis of the injection duct 111 in the exact desired position, that is to say, centered on the axis of a plastic receiving mould 2 placed in injection position.

A space 120 separates the member 108 from the upper part of the piece 112 and ensures a low heat transmission of this piece 112 to member 108.

Heating means 141 are placed in space 120 along substantially the entire height of the piece 112 and heat the injection pot in order to liquefy the plastic material to be injected. The temperature of this injection pot is controlled by pyrometric gauges (not shown) controlling the energizing of these heating bodies.

The axial position of the piece 112 with respect to the member 108 is fixed by two tie-rods 121. Tie rods 121 are engaged in borings of corresponding diameter provided in the frame B and comprise shoulders 122 bearing on the lower surface of this frame under the action of the tightening obtained due to screws 123 applying bearing members 124 on the top surface of the frame B. Each tie-rod 121 is further engaged in bores provided in the auxiliary frame 113 and comprises two threaded parts on which nuts 125, 126 are screwed, which are tightened against the upper and lower surfaces of the auxiliary frame 113 respectively so as to fix the axial position of this auxiliary frame 113 with respect to the frame B.

At the level of the lower part of the injection duct 111, the piece 112 comprises circular grooves 116 on its outer surface and one of which at least is surrounded by a ring 117 in order to form a cavity connected through holes 118, provided in the ring 117, to a cooling circuit 119.

The injection duct 111 is provided in its upper part with a hollow cylinder 127 the lower surface of which rests on a shoulder 128 provided in the piece 112. This hollow cylinder 127 is maintained in its axial position with respect to the piece 112 by means of a frontal part 129 fixed on the piece 112 by means of tightening members 130. Part 129 has a skirt 129' engaged in the upper extremity of the piece 112 and which abuts against the hollow cylinder 127 thereby maintaining cylinder 127 against the shoulder 128. This frontal part comprises further a threaded hole 131 co-axial to the injection duct 111.

A nozzle 132 has a rear part containing a thread corresponding to that of threaded hole 131, a flange 133 on its middle part presenting in plan view an hexagonal shape and an upper part 134 presenting a conical shape corresponding to the shape of the part 27 of the plastic receiving mould 2. This nozzle 132 has a central conical passage 135 which is co-axial to the injection duct 111 when said nozzle is fixed on the frontal part 129 and which becomes larger in cross section in a downwardly direction. The lower part of said nozzle 132 comprises a conical portion 136 with an opening which is larger than that of the passage 135 and which cooperates with a pin valve 137 of the closing device of the injection pot. A protective covering 138 presenting an opening 139 is clamped between the flange 133 of the nozzle 132 and the frontal part 129 and covers the frontal face of the injection pot.

The plastic material feeding device comprises a funnel 140 provided in the frame B under which a reservoir of plastic material, in solid form, is fixed. A duct 142 connects this funnel to a driving device 143 for the plastic material.

This driving device 143 comprises a chamber 144 in which the plastic material falls by gravity. A pusher 145 actuated by two jacks 146 pushes the plastic material located in a chamber 144 through a passage 147 into a housing 148 provided in the piece 112. The driving device 143 is fixed on said piece 112 by means of screws 149.

The device which pressurizes the plastic material is located inside the auxiliary frame 113 and comprises a cylinder 150 inside which a piston 151 moves under the action of a fluid passing through the openings 152, 153 coming out in the chambers 150a and 150b of the cylinder 150 respectively. The top surface of the cylinder is constituted by the lower surface 154 of the piece 112 whereas the lower surface of this cylinder is formed by a closure plate 155. The piston 151 is provided at its upper extremity with a pusher 156 sliding without clearance in a bore provided in the piece 112 concentric to the injection duct 111 and passing through the housing 148. This piston 151 is further provided with a guide 157 sliding without clearance in the closure plate 155. A hole 158 traverses the piston 151 along the axis of said piston.

The closure device of the injection pot comprises a cylinder 159 disposed inside the auxiliary frame 113, the upper frontal surface of which is constituted by a disc 160. A piston 161 moves axially inside this cylinder 159 and comprises two extensions 162, 163 sliding without clearance in bores provided respectively in the disc 160 and in the lower frontal surface of the cylinder 159. This piston 161 is pierced along its axis by a bore 164 concentric to the injection duct 111.

This closure device comprises further a rod 165 engaged in bores 164, 158, in the injection duct, and without clearance inside the hollow cylinder 127. This rod carries at its upper extremity the pin 137 the frontal extremity 166 of which presents a shape corresponding to the shape of the conical portion 136 of the nozzle 132.

This rod 165 is fixed to the piston 161 through the intermediary of a threaded washer 167 on the extension 163 of the piston 161 and in which the threaded extremity of the rod 165 is screwed. A counter nut 168 fixes the rod 165 in its desired position. A regulating device of the stroke of the pin 137 is constituted by a screw 169 threaded in the auxiliary frame 113 and co-operating with the threaded washer 167.

The cylinder 159 comprises further two openings 170, 171, giving passage to fluid driving the piston 161, and respectively connected to the openings 152, 153 of the cylinder 150. These openings 152, 153 are connected through the intermediary of a valve alternatively to a source of fluid under pressure and to a discharge reservoir respectively.

The assembly of this plastic material injection device is located under the table 1 of the transfer device and at a distance away from it such that when the table remains in its low position, which is the plastic material injection condition, the frontal part 134 of the nozzle 132 is applied in the housing conical section 27 of the plastic receiving mould 2, and also such that the extremity of the nozzle is engaged within the said plastic receiving mould further than the opening 26. However when the table 1 is in a high position it is able to pivot, the nozzle 132 then being removed from conical section 27 and clear of the table.

The fluid injection and container forming means which act on the injected plastic material comprises on the one hand the fluid injection device and on the other hand a pumping and pressurizing device for the fluid.

The fluid injection device is constituted by three assemblies telescopically mounted and displaceable with respect to one another. The relative displacements of these assemblies are produced by the actuating device causing the vertical displacements of the different devices of the machine.

These three assemblies are:

The head carrying assembly, the needle carrying assembly and the mandrel carrying assembly.

The head carrying assembly as shown in FIGS. 10 and 11 is constituted by a hollow cylinder 172 presenting in its lower part a tapping 173 in which a head 174 is threadably engaged. The outside surface of this hollow cylinder 172 comprises a shoulder 175. The lower part of cylinder 172 has a smaller outside diameter and is engaged in a bore provided in a bridge 176 of the actuating device. A nut 177 screwed on a thread carried by the hollow cylinder 172 tightens the said bridge 176 against the shoulder 175, thereby rendering the hollow cylinder 172 solid with the bridge 176. This nut 177 comprises an annular groove 178 merging in the inside surface of a a radial bore 179 which connects this groove 178 with the outside surface of the nut. The head 174 comprises a circular ring 180 bearing on the frontal surface of the hollow cylinder 172 and defining thus the axial position of this head with respect to the hollow cylinder. This head 174 comprises a portion 181 having a shape corresponding to the shape desired for the neck of the container being manufactured. A bore 182 concentric to the axis of the head 174 connects the bottom of portion 181 to the space within the hollow cylinder 172. A passage 183 connects the bottom of portion 181 to the groove 178 through the intermediary of a duct 184 provided in the wall of the hollow cylinder 172.

This head 174 constitutes alternatively the second part of the plastic receiving mould 2 and the second part of the forming mould 3.

The needle carrying assembly comprises a sleeve 185 engaged in a bore provided in a second bridge 186 of the actuating device and tightened on bridge 186 between a shoulder 187 provided on its outside surface and a threaded ring 188 screwed on an outer threaded portion of sleeve 185. This sleeve 185 is adapted to slide without clearance along the outside surface of the hollow cylinder 172 of the mould carrying assembly. A needle support 189 is fixed on the frontal upper surface of the sleeve 185. Said support 189 comprises a part 190, extending downwards inside the sleeve 185 and inside a part of the hollow cylinder 172, comprising a bore 191 concentric to the axis of the head 174. This part 190 is provided at its lower extremity with a hollow needle 192 the lower extremity of which is engaged in the bore 182 of the head 174. The top extremity of the bore 191 communicates with a duct 193 provided in the support 189 and connected through a feeding duct 194 to the fluid under pressure to be injected. This support comprises further a cavity, concentric to the bore 191 and extending from the duct 193 upwards, to which receives a stuffing box 195 thereby ensuring the tightness between this support and a mandrel carrying rod 197 of the mandrel carrying assembly. A tubular piece 196 concentric to the bore 191 is mounted on top of the support 189 and extends above it vertically.

The mandrel carrying assembly comprises a sleeve 198 sliding freely on the outside surface of the tubular piece 196 and rigidly connected to a bridge 199 of the actuating device by means of a threaded ring 200 bearing against a flange 201 provided on the outside surface of the sleeve 198 and screwed on an anchoring piece 202 fast with the bridge 199. A plug 203 closes the upper frontal surfaces of the sleeve 198. This plug 203 comprises a part extending downwardly inside the sleeve 198 and on which the mandrel carrying rod 197 is fixed. This mandrel carrying rod extends into the part 190 of the support 189 and carries at its lower extremity a mandrel 204 the diameter of which is such that the latter slide without clearance inside the needle 192, at least over a certain part of its length. A cavity 205 is provided in the upper extremity of the plug 203 in which a stainless steel basket 206 is placed to receive wadding or cotton-wool. A cover 207 threaded on the plug 203 maintains the basket 206 in place. This cover 207 and the bottom of the basket 206 are provided with perforations. This cavity 205 communicates by means of a bore 208 with the inside of the sleeve 198. In this way, air can come in and out of the injection device during the relative displacements of the three assemblies.

The pumping device for the fluid comprises a suction and backing device and a pressure release device.

The suction and backing device shown in FIG. 9 comprises a base plate 209 fixed by means of tightening means on the frame B of the machine. This plate 209 carries a double effect jack comprising two chambers 211, 212 each provided with an opening, for the passage of a driving fluid, and with a driving piston 213. A cap 214 affixed to an extension of the double acting jack has a lower part 215 presenting a large inside diameter and an upper part having an inner sleeve 216 composed of a material that is inert with respect to the liquid to be injected, for example glass. The upper front part of this cap 214 presents a bore 217 giving access to a suction duct 218 and to a backing duct 219 of the liquid to be injected. A piston 220, driven by the driving piston 213, slides without clearance inside the sleeve 216. In order to vary the inside volume of the cap 214 by controlled displacements of the pistons 213 and 220, the lower part 215 is connected to the atmosphere through the intermediary of a stainless steel basket 221 screwed in a tapping provided in the wall of the cap 214. The basket 221 contains cotton-wool in order to filter the air entering the injection device.

The suction duct 218 is connected to a fluid reservoir whereas the backing duct 219 is connected to the feeding duct 194 of the fluid injection device.

Each of the ducts 218, 219 comprises a closing device constituted in the embodiment shown by pushing members S–1, S–2 respectively, clamping the duct made of a supple and elastic material against an abutment (see FIG.

19). This type of closure is specially advantageous where it is necessary to provoke quick closures and openings, almost instantaneously. It is however evident that these closure devices could also be constituted by electromagnetic valves or any other suitable valves, if desired.

The chamber 211 of the double effect jack is connected through the intermediary of a flow rate meter to a source of fluid under pressure. The flow rate meter is intended to adjust the time necessary for the piston 213 to pass from its rest position to its advanced or injection position. It is thus possible to vary the speed of injection of the liquid. This flow rate meter may be constituted for example by a chamber 222 comprising an inlet opening 223 for the fluid under pressure, the passage surface of which may be modified by the rotation of a square filet screw 224 co-axial to the chamber 222. The outside surface of the filet on screw 224 has a diameter corresponding to the diameter of the chamber, the axial position of said screw being fixed with respect to the said chamber.

The pressure release device is also carried by the base plate 209 and comprises a chamber 225 fed at its two extremities with fluid under pressure through passages 226 and 227. Chamber 225 contains a check valve constituted by a ball 228 resting on a seat 229 to prevent any return of the fluid under pressure in the passage 226. This chamber 225 is further provided with a passage 230 located in the vicinity of the passage 226 and connected to the chamber 212 of the double effect jack of the suction and backing device.

On the axis of said chamber 225 a single effect jack 231 is located the cylinder 232 of which is connected to the chamber 225 by a bore inside which slides without clearance a plunger 233 fast with the piston 234 of the jack 231. The lower side of the cylinder 232 is connected through a bore to the atmosphere, whereas the top part of this cylinder located on the other side of the piston 234 has an opening 235 giving passage to the fluid actuating the said piston 234. The jack 231 comprises further a device for regulating the stroke of the piston 234. This regulating device comprises an extension 236 at the upper extremity of the piston 234 sliding without clearance in a bore provided in the upper frontal face of the cylinder 232 and engaged inside an externally threaded sleeve 237. The radial position of said sleeve 237 is fixed with respect to the jack 231 by means of a screw 238 engaged in a slot 239. A threaded plug 240 is screwed on the sleeve 237. The axial poisition of plug 240 is fixed with respect to the jack 231 whereas the sleeve 237 is axially displaceable in order to modify the axial position of this sleeve with respect to the jack 231. An axial abutment 241 is fixed on the extremity of the extension 236 and presents a diameter greater than that of this extension so that when a downward displacement of the piston 234 occurs, this abutment bears on the frontal face of the sleeve 237 thus limiting the stroke of this piston.

From the foregoing description, it is easy to see that the fluid injection device is designed so as to be easily disconnected from the machine without necessitating a dismantling of the device itself. In fact, the part of the suction and backing device which comes in contact with the liquid, the fluid injection devce, and the tubes connecting these two elements to each other and the liquid pump to the liquid reservoir are very easily detachable and form a removable unit which may be sterilized after assembly. This fact is important since the injection device has to be able to be sterilized as a whole. In fact, it would be useless to sterilize the different pieces separately and then assemble the device, this assembling being impossible to perform under sterile conditions.

The device for sealing the formed and filled containers comprises a clamping device for clamping the neck of the container, a hot air spraying device acting on the top part of said neck of the container and a device for closing the neck.

The clamping device, shown in FIG. 14, comprises a clamp constituted by two pieces 242 pivoted on a support 243 mechanically connected to a mobile plate 244, the vertical displacements of which are controlled by the actuating device. Each of the pieces 242 has a front part 245 presenting a shape corresponding to one half of the neck of a container. When this clamp is in clamping position, these front parts 245 clamp the neck of a container between them so as to fix the said neck in an exactly centered position and to maintain it in its axial position. The rear part 246 of each of these pieces 242 comprises a pusher 247 intended to co-operate with a conical sleeve 248 of the actuating device in order to close the clamp. A spring 249 fixed between two studs 250 fixed respectively on the one and the other pieces 242 tends to maintain the clamp in an open rest position. The pushers 247 are constituted by screws engaged in tappings of a support and the axial position of which, with respect to said support, is determined by a counter nut. In this way, by modifying the axial position of the screw with respect to the support, it is possible to modify the spacing of the front parts 245 when they are in their clamping position. These parts 245 are further provided with refrigerating circuits 251.

The hot air guiding device is also carried by the mobile plate 244 and comprises a body 252 of a generally cylindrical shape comprising an axial bore 253 and an annular chamber 254. This body 252 is further obliquely traversed by tubes 255 passing through the annular chamber 254.

A head 256 is mounted on the frontal face of the body 252 by means of a fastening member 257. This head 256 presents a cylindrical shape and comprises a central bore 258. A chamber 259 of generally conical shape is fed with hot compressed air through an aperture 260. This chamber 259 is connected by means of an annular passage 261 to the said central bore 258. The experiments made on such a head have shown that the totality of the air distributed through the annular passage 261 goes up in the direction of the arrow $f$ in the central bore 258. In this manner no flow of hot air is passing out of the head 256. The hot air going up through the central bore 258 is caught and evacuated through the tubes 255. Openings 271 giving access to the chamber 254 supply it with refrigerating water.

The sealing device for sealing the neck of a container comprises a punch 262, engaged in the axial bore 253 and the central bore 258 of the head 256, carried by a punch carrier 263 fixed on a mobile plate 264 actuated by means of the actuating device.

This punch comprises a dead hole 265 in which a tube 266 is disposed. Thus tube 266 is connected to an inlet 267 of refrigerating water whereas the dead hole 265 is connected to an evacuation duct 268 both provided in the punch carrier 263. The lower extremity 269 of the punch comprises a cavity 270 presenting the shape that the upper extremity of the neck of the container in intended to have after its closure.

The actuating device which produces the vertical displacements of the different members of the various devices described herein is composed of three driving units. The first such unit serves to actuate the transfer device, the second the fluid injection device and the third the sealing device. The details of the first and second uits are best seen in FIG. 2 while the third unit appears in FIG. 12.

The first driving unit which actuates the transfer device in a vertical direction comprises a single effect jack 54, fixed on the frame B by means of tightening members 273, the cylinder 53 of which is co-axial to the hollow shaft 4 of the transfer device. The piston 50 of this jack 54 comprises in its frontal face a bore in which a tube 279 of the second driving unit slides without clearance. This frontal face of the piston 50 comprises further a bore 274 connecting the cylinder 53 to the chamber 52 provided in the skirt 49 of the piston 50 and the outside surface of the hollow shaft 4. The cylinder 53 comprises further openings 275, 275a giving passage to the fluid under pressure actuating the piston 50. This fluid also fills both the chamber 52 and a duct 276 provided in the hollow shaft 4 to communicate with a cavity 277 provided in the upper extremity, of increased diameter, of hollow shaft 4. A piston 278 slides without clearance in this cavity 277 and along the tube 279. This piston comprises a skirt 280 carrying a thread on its outside surface.

An adjustable abutment 281, the upper face of which gives passage to the tube 279, is screwed on the skirt 280 of the piston 278. This adjustable abutment 281 traverses the table 1 through a bore 272 provided therein. The distance separating the upper surface of the table 1 from the upper face of this adjustable abutment 281 is thus adjustable through axial displacement of this abutment.

The second driving unit comprises the bridges 176, 186 and 199, which support, carrying respectively the mould head carrying assembly, needle carrying assembly and mandrel carrying assembly of the fluid injection device. These bridges slide along columns 282 rigidly fixed on the frame B of the machine and connected between them through a portal 283 in order to ensure a great rigidity of these columns. This second driving unit comprises further jacks 284, 285, 286 mechanically connected to the bridges 176, 186 and 199 respectively and causing the vertical displacements of the said bridges.

These three double effect jacks 284, 285 and 286 are situated concentrically and disposed in the cylinder of the jack 284 rigidly connected to the frame B of the machine. These jacks are fed with fluid under pressure through either of their extremities in order to drive their respective pistons 287, 288, 289 in one direction or the other.

The inlets 290, 291, 292 for fluid under pressure located at the lower extremity of each of the jacks 284, 285, 286 are separated so that each piston 287, 288 and 289 displaceable upwardly independently from the others, whereas the inlets of fluid under pressure located at the upper extremities of these jacks are connected together and are fed by one aperture 293 provided in the jack 284.

The piston 287 constitutes the lower frontal face of the jack 285 and is rigidly fixed to it. This jack 285, constituted by a tubular element, is mechanically connected to the tube 279. Tube 279 extends through the whole transfer device and has one threaded extremity, with a shoulder 294 located in the vicinity thereof. The bridge 176 contains a bore in which the extremity of the tube 279 is engaged. The bridge 176 is connected to tube 279 by means of a threaded ring 295 applying this bridge 176 against the shoulder 294. This threaded ring 295 comprises an upwardly directed skirt 296, the outside surface of which is threaded. A threaded sleeve 297 is screwed on this skirt 296 and constitutes an abutment adjustable in height so as to define the minimum distance separating the bridge 176 from the bridge 186.

The piston 288 is rigidly fixed on the jack 286, also constituted by a tubular member, which is itself mechanically connected through the intermediary of a tube 298, sliding inside the tube 279, to the bridge 186. The fastening of bridge 186 on tube 298 is similar to the manner of fastening of the bridge 176 on the tube 279 and comprises a threaded ring 299 screwed on the extremity of the tube 298 to press the bridge 186 against a shoulder 300 of the tube 298. This threaded ring 299 comprises also a skirt 301 on which a sleeve 302 is screwed constituting an adjustable abutment which defines the minimum distance separating the bridges 186 and 199.

The piston 289 is rigidly mounted on a rod 303 rigidly connected to the bridge 199.

This second driving unit is thus able to displace each bridge 176, 186, 199 with respect to the others and also to displace simultaneously two or three of these bridges with respect to the frame of the machine while maintaining their relative positions. This is due to the fact that the jacks 284, 285 and 286 are enclosed the ones in the others.

The third driving unit (FIG. 12) comprises a first double effect jack, the casing 304 of which is fixed on the frame B of the machine and in which openings 305, 306 are provided for passage of the fluid under pressure actuating the piston 307 of this jack. This piston 307 is constituted by a tubular member extending partly outside of the jack proper and lodged, over a part of its length, in a protective shield 308 fixed to the casing 304. A conical sleeve 248 slides on tubular member 307 between two adjustable axial abutments constituted by rings 309, 310 screwed on threads provided in the tubular member 307 and subjected to the action of a return spring 311 tending to apply it against the lower abutment 309.

An externally threaded sleeve 312 sliding freely on the tubular member 307 is screwed in a plate 313 resting on the frontal face of the shield 308 when the piston 307 is in its lower position. The mobile plate 244 of the sealing device comprises a bore giving passage to the sleeve 312 and is fixed on sleeve 312 by means of two threaded rings 314, 315 screwed on the said sleeve and tightening this plate 244. A spring 316 rests, on the one hand, on the upper frontal face of the sleeve 312, and on the other hand, on the lower face of a nut 317 screwed on the extremity of the tubular member 307, tending to move the said sleeve 312 away from the nut 317.

A second double effect jack is housed inside the tubular member or piston 307 comprising openings 318, 319 for the passage of the fluid under pressure actuating the piston 320 of this second jack. This piston 320 is provided with a rod 321 located inside the piston 307 but extending from the upper end thereof. This rod 321 comprises an axial abutment 322 on which the mobile plate 264 of the sealing device rests. This mobile plate 264 rests through its own weight on the axial abutment 322 and is applied against it through a spring 323 bearing on a nut 324 screwed on the extremity of the rod 321.

The control means for the described apparatus is composed of manually controlled valves and means suitable for connecting the different hydraulic cylinders of the installation to fluid supplies operating at a high pressure R and a low pressure r respectively. Since these elements of the control device are of well known type, they will not be described here. They will be mentioned incidentally in explaining the operation of the installation.

It is evident that the manually controlled valves may be replaced in a non illustrated variant of the installation by electrovalves electrically controlled through an automatic control device replacing the operator. This automatic control device will not be described, since the details and construction thereof will be clearly apparent to those skilled in the art.

In their rest positions, the different members of the installation are in the positions corresponding to those illustrated on the diagram comprising FIGS. 19 to 21. All the valves are in their own rest state, that is to say, in the state in which they are maintained by their return device.

The "rest position of the installation" is to be understood to mean the state which the installation is in when it is ready to work but is not actually performing any operation. In this state the driving fluids are under pressure and it suffices for the operator to effectuate the manipulations which will be described hereinafter to have the installation work.

In this rest position of the installation, the different members are located in the following positions:

(A) *Actuating device.*—This actuating device is in a position such that:

(1) The upper bridge 199 is in its low position, while the middle bridge 186 and the lower bridge 176 are in their high position.

(2) The table 1 and its abutment 281 are maintained in the high position.

(3) The pistons 307 and 320 driving the sealing device are both in the high position.

(B) *Table rotating device.*—The ratching piston 65 and the driving piston 62 are in their return position.

(C) *Plastic material injection device.*—In the rest position of the installation, the pin valve 137 is maintained in closed position, the injection piston 151 is in return position and the pusher 145 feeding the plastic material is in its forward position.

(D) *Liquid injection device.*—The closing devices S–1, S–2 of the suction duct 218 and backing duct 219 are in closed position.

The driving piston 213 of the liquid pump and the piston 234 of the pressure release device are in their respective return position.

When the installation is in this rest position, the operator may control a manufacturing cycle of a container. This manufacturing cycle of a container comprises the following operations:

(1) The locking of the angular position of the table:

By actuating the valve 325, the operator causes fluid under high pressure R to be fed to the opening 104 of the locking device cylinder 92 which causes the engagement of the free extremity 100 of the locking finger 98 in the conical bore 103 of one of the members 101 of the table 1.

However, if the table is not in an angular position such that a plastic receiving mould 2 is located in its plastic material injection position, the locking of the table as well as any subsequent operation is prevented through an electrical interlock. These electrical safety interlocks being well known, they will not be described here.

(2) The downward movement of the table:

The operator actuates the valve 326 to connect the opening 275 of jack 54 to its discharge and to feed fluid under high pressure R to the opening 275a. This causes the lowering of the piston 50 and thus of the table 1, and the connecting to the discharge of the chamber 277 to permit the lowering of the table abutment 281 when, later on, the bridge 176 bears on it. In this low position of the table, the nozzle 132 is partly engaged in a plastic receiving mould 2.

(3) The lowering of the lower bridge 176:

By actuating the valve 327, the operator feeds the cylinder 284 with fluid under high pressure R through the opening 293 through the intermediary of a discharge vent D (FIG. 21) and connects the opening 290 of cylinder 284 to the discharge. This lowers the brige 176 into its low position determined by the table abutment 281, itself located in low position.

The pistons 289 and 288 being located inside the piston 287, are driven during the displacement of piston 287 which causes the lowering of the bridges 199 and 186 by an amount equal to the movement of the bridge 176.

This lowering of the bridge 176 causes the closing of the plastic receiving mould 2 through the head 174 of the fluid injection device.

(4) The lowering of the middle bridge 186:

By actuating the valve 328, the operator connects the opening 291 of the cylinder 285 to the discharge so that this cylinder 285 is fed with fluid under high pressure R through the opening 293 through the intermediary of the discharge vent D. This causes the lowering of the piston 288, and thus of the bridge 186. Since piston 289 is located inside the cylinder 285 it undergoes an identical displacement causing the lowering of the bridge 199 to the same extent as the bridge 186.

This lowering of the bridge 186 results in the introduction of the needle 192 in the head 174 of the fluid injection device. The bridge 199 being already in its low position, this needle 192 is closed by the mandrel 204.

(5) Injection of plastic material:

By actuating the valve 329, the operator causes the feeds fluid under high pressure R to the cylinder 150 through the opening 153 and to the cylinder 159 through the opening 171 and connects the openings 152 and 170 of these cylinders to the discharge.

This causes the opening of the pin valve 137 and the raising of the piston 151 of the plastic material injection device, causing the injection of plastic material into the mould 2 through the nozzle 132.

(6) The operator re-sets the valve 329 to its rest position, thus closing pin valve 137 and returning the piston 151.

(7) The operator observes a waiting time in order that the injected plastic material may begin setting in the mould 2. In this manner the plastic preform moulded in the mould 2 may be withdrawn without deformation. Thanks to the light shrinkage of the plastic, the needle 192 is strongly clamped in this preform.

(8) The raising of the table:

The operator re-sets the valve 326 in the rest position which returns the table to its raised position. The bridges 176, 186 and 199 are also raised as a result of the table reaching its raised position.

This displacement of the table disengages the mould 2 from the nozzle 132 of the plastic injection device.

(9) The raising of the lower bridge 176:

The operator re-sets the valve 327 in rest position, thus raising the bridge 176 and withdrawing the completed preform from the plastic receiving mould 2, the preform being supported on the needle 192.

(10) The unlocking of the table:

The operator re-sets the valve 325 in rest position to return the locking device to its rest state.

(11) The rotation of the table:

The operator actuates the valve 330 to apply fluid under high pressure R to the cylinder 64 of the ratching device through the opening 74 and to connect the opening 75 of this cylinder to the discharge. This produces the engagement of the lock 70 in a groove 55 of the ring 47. Once this lock is in active position, the hole 78 of the cylinder 64, connected to the opening 85 of the driving cylinder 63, is fed with fluid under pressure whereas the opening 86 of this driving cylinder 63 is connected to the discharge through the holes 76 and 77 of the ratching cylinder 64.

The driving piston 62 is moved and, through the intermediary of the mechanical linkage 80, rotates the table into its new position in which a forming mould 3 will have replaced a plastic receiving mould 2 and therefore is located in front of the fluid injection device.

(12) The locking of the table, an operation similar to the operation No. 1.

(13) The lowering of the lower bridge 176, an operation similar to the operation No. 3, in which the forming mould 3 is closed through the head 174 of the liquid injection device.

(14) The application of pressure to the liquid to be injected:

The operator actuates the valve 331, causing fluid under low pressure r to be fed to the cylinder 211 at the opening 223 through the flow rate meter 224, and connecting this cylinder to the discharge through the opening 212. The piston 213 tends to displace upwardly, but the two closing devices S–1, S–2 of the suction and backing ducts 218 and 219 being closed, this piston cannot move. The liquid contained in the sleeve 216 is set under pressure.

(15) The raising of the upper bridge 199 and the feeding of the plastic material:

The operator actuates the valve 332, fluid under high pressure R to the cylinder 286 by the opening 292 and thus raising of the piston 289 to force the fluid through the opening 293 connected to the discharge through the intermediary of the discharge vent D, and thus of the bridge 199 withdrawing the mandrel 204 out of the needle 192. This operator also returns the jacks 146 of the plastic material feeding device, causing thus the return of the pusher 145 to a position for which the funnel 140 opens into the chamber 147. Chamber 147 becomes filled with plastic material for example in granular form.

(16) The opening of the backing vent S–2:

By actuating the valve 333 the operator opens valve S–2. The piston 213 may thus move upwards and injects the liquid contained in the sleeve 216 through the needle 192 into the mass of plastic material of the preform causing it to expand or blow up inside the forming mould 3, Thus the plastic container is formed inside mould 3.

(17) The pressure releasing of the formed container:

By actuating the valve 334 the operator causes the displacement of the piston 234 of the pressure releasing device, causing in turn the injection of the fluid contained in the chamber 225 into the liquid injection cylinder through the opening 212. This withdraws the piston 213 and also piston 220 of a certain quantity. This withdrawal of the piston 220 removes a certain volume of liquid from the container by suction.

(18) The opening of the suction vent S–1:

By actuating the valve 335 the operator opens the suction valve S–1.

(19) The lowering of the upper bridge 199 and the forward motion of the plastic material feeding pusher:

The operator re-sets the valve 332 in its rest position thus raising the upper bridge 199 and producing the forward motion of the pusher 145 to introduce new plastic material in the duct 111.

(20) The closing of the backing vent S–2:

The operator re-sets the valve 333 in its rest position, closing the backing vent S–2.

(21) The return of the releasing piston:

The operator re-sets the valve 334 in rest position to return of the releasing piston 234.

(22) The return of the liquid injection piston:

The operator re-sets the valve 331 in rest position returning the piston 213 of the liquid injection device.

(23) The raising of the middle bridge 186:

The operator replaces the valve 328 in rest position again raising the piston 288 and thus the bridge 186 and the upper bridge 199.

This lifting of the bridge 186 causes the withdrawal of the needle 192 out of the container disposed in the forming mould 3.

(24) The raising of the lower bridge 176:

By replacing the valve 327 in its rest position the operator lifts the lower bridge 176 and thus the bridges 186 and 199 simultaneously.

This raising of the bridge 176 separates the head 174 from the forming mould 3 and thus withdraws the neck of the container.

(25) The unlocking of the table:

Operation similar to the operation No. 10.

(26) The rotation of the table:

Operation similar to the operation No. 11.

This rotation brings the forming mould 3 containing the formed container in an intermediate position.

(27) The locking of the table:

Operation similar to the operation No. 1 or 12.

(28) Waiting of the container in the finishing mould 3.

(29) Unlocking of the table:

Operation similar to the operation No. 10 or 25.

(30) The rotation of the table:

Operation similar to the operation No. 11 or 26.

This rotation brings the forming mould 3 containing the formed container in front of the sealing device.

(31) The locking of the table:

Operation similar to the operation No. 1, 12 or 27.

(32) The lowering of the clamps and of the nozzle of the sealing device:

The operator actuates the valve 336 which feeds the cylinder 304 with fluid under high pressure R through the opening 306 and connects it to the discharge through the opening 305, causing the lowering of the whole sealing device. During this lowering, the cone 248 closes the clamps 245 against the neck of the container of plastic material maintained in the forming mould 3.

(33) Waiting of a sufficient time in order that the hot air flowing out through the nozzle 252 sets the plastic material of the upper part of the neck of the container in fusion.

(34) The lowering of the pin of the sealing device:

The operator actuates the valve 337, feeding fluid under high pressure R into the opening 318 and connecting opening 319 to the discharge, thus causing the lowering of the piston 320 and the punch 262 to seal the neck of the container through crushing of the melted plastic material of the upper part of the neck of the container.

(35) The raising of the sealing device:

The operator re-sets the valves 336 and 337 in their rest positions which lifts, respectively the clamps and the nozzle, as well as the punch.

(36) The unlocking of the table:

Operation similar to the operation No. 10, 25 or 29.

(37) The rotation of the table and the ejection of the container:

The rotation is effected as described in the operations No. 11, 26 or 30. However, during this rotation, the roller 45 abuts against a stop carried by the frame B which opens the forming mould 3, the half 39 of the mould 3 pivoting around the axis 40.

Through the combined movement of this opening of the mould and of the rotation of the table, the finished container is ejected out of the mould.

The manufacturing cycle of a container made of plastic material being completed, a new cycle starts, identical to the one described.

In fact, during the last rotation of the table 1, a mould 2 is set into its plastic material injection position.

As the table 1 comprises a number of moulds of each kind, moulds 2 and 3, equal to twice the number of the plastic material injection or liquid injection and sealing devices, the installation enables the manufacture simultaneously of at least two plastic material containers. The cycles of successive operations for the manufacture of each of these containers are identical but lagging the one with respect to the other.

In fact, during the operations Nos. 27 to 37 of the manufacturing cycle of the first container, the operations Nos. 1 to 26 of the manufacturing cycle of the second container are effected.

One embodiment of the installation according to the invention has been described as a non-limitating example but it is evident that numerous equivalent mechanical solutions could be employed without departing from the scope of the claimed protection.

Particularly, the installation described comprises a rotative transfer device but it goes without saying that this transfer device could in another embodiment move step by step in a rectilinear manner with the plastic and liquid injection and sealing devices being situated in alignment.

Further, it is also possible to provide an installation with a transfer device angularly displaceable by an angle less than 360° in a back and forth movement. Here also, the plastic and liquid injection devices and the sealing device are correspondingly disposed.

Figure 15:
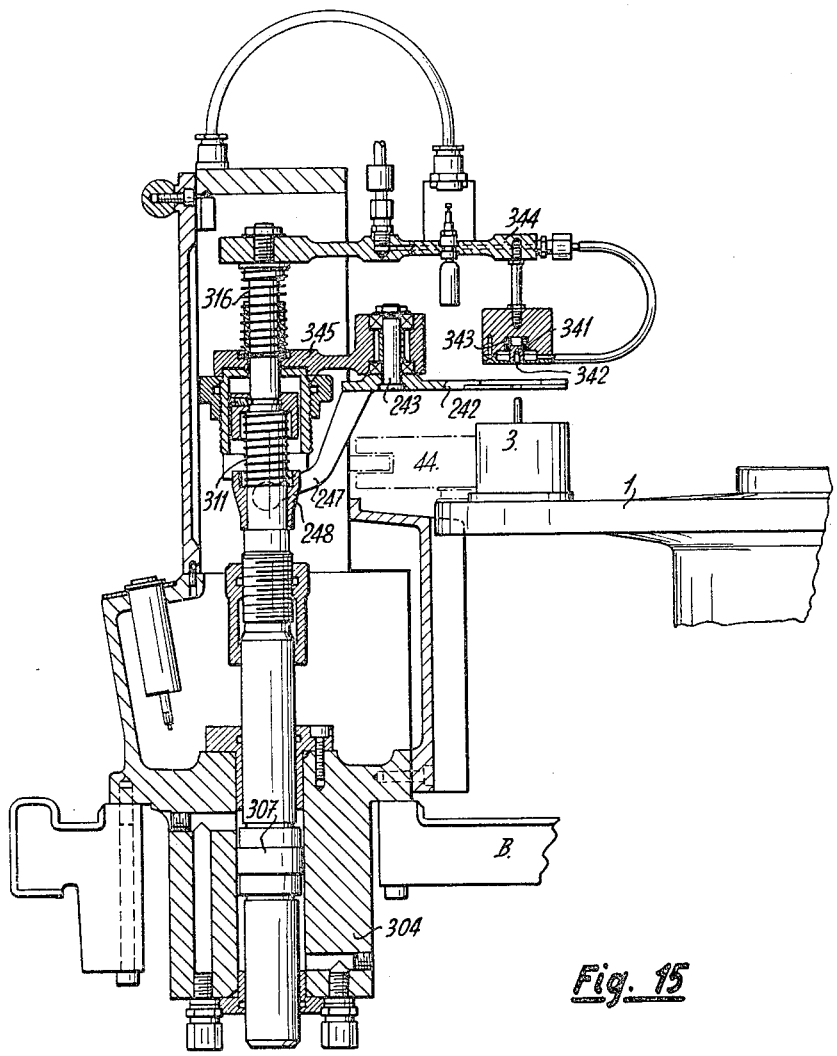
FIG. 15 is a view, partially in cross section, of a second embodiment of the sealing device.

FIG. 15 shows a second embodiment of the sealing device which is simple to construct and which presents certain advantages with respect to the embodiment of the device previously described.

In this embodiment (illustrated to FIG. 15) the sealing device comprises a clamping device for clamping the neck of the container and a sealing device for this neck vertically displaceable under the action of one of the driving units of the actuating device.

The clamping device for the neck of the container comprises, the same as the one of the previously described sealing device, two clamps 242, pivoted on a support 243, mechanically connected to a mobile plate 344 vertically displaceable under the action of the actuating device. As in the first embodiment of the sealing device, each clamp comprises a pusher 247 intended to co-operate with a conical sleeve 248 of the actuating device, to produce the tightening of the clamps.

The sealing device comprises a head 340 carried by a mobile plate 345 actuated in its vertical displacements by means of the actuating device. This head carries in its frontal face a print 341 made in a material which does not stick on the plastic when in deformable state. This print may be for example formed of sapphire or Teflon. This print comprises a housing 342 presenting the shape that is desired for the extremity of the neck of the container when closed. One or several heating bodies 343 are disposed around this print and bring it to a temperature higher than the fusion temperature of the plastic constituting the container. The head 340 and the mobile plate 344 are each provided with a refrigerating circuit.

The driving unit of the actuating device intended for the actuating of this sealing device is practically equivalent to the third driving unit previously described, but with the piston 320 and everything it actuates omitted.

It is to be noted however that this driving unit is somewhat simpler thanks to the fact that neither the axial position of the conical sleeve 248 nor the axial position of the mobile plate 344 is adjustable. Plate 344 corresponds to mobile plate 244.

The movements of this sealing device are equivalent to those effected by the clamps and the head of the sealing device according to the first embodiment. During the lowering of the piston 307, the head 340 and the clamps 242 descend. These clamps, when arrived at the height of the neck, are closed by the movement of pushers 247 produced by the conical sleeve 248 and are immobilized in this position. However, the piston 307 continues its descent, compressing the spring 316 and taking the head 340 in its movement. The neck of the container is introduced in the housing 342 of the print 341 and melts under the effect of the heat of print 341, which fuses and seals this neck. Then, when the piston 307 raises, the head 340 is disengaged, then the clamps are untightened and returned. The neck of the container cools and the plastic material hardens, causing the definitive sealing of the container.

This sealing device is specially simple and strong which is an important advantage.

We claim:

1. An apparatus for making plastic containers by the expansion of a preform due to an injection therein of a fluid to be contained in the formed container, said apparatus comprising: a transfer device arranged for intermittent displacement; at least one plastic receiving mould having first and second parts; at least one forming mould having first and second parts; means for mounting the respective first parts of said moulds on said transfer device in uniformly spaced, alternating positions along a path parallel to the displacement of the transfer device; a head displaceable axially of said transfer device and alternately constituting the second part of said plastic receiving mould and then the second part of said forming mould; an injection means for injecting plastic material into said plastic receiving mould to mould said preform therein; sterile means for injecting said fluid into said preform after transfer thereof into said forming mould, the injection of fluid expanding said preform to conform to the internal shape of said forming mould; means for sealing the forming container filled with said fluid; and means for ejecting the formed and filled container from the apparatus; said sterile means for injecting fluid including said axially displaceable head, a hollow fluid injection needle within the head, and a mandrel selectively closing said needle; means for positioning said head against the first part of said plastic receiving mould during moulding of said preform therein, said mandrel then closing said needle; means for axially retracting said head from the plastic receiving mould to a position clear of said transfer device during displacement of the latter, said preform then being carried on said needle; means for subsequently positioning said head against the first part of said forming mould moved into alignment therewith, said preform thus being inserted into said forming mould; said sterile means for injecting fluid further comprising means for directing said fluid under pressure into said hollow needle to simultaneously expand said preform within the forming mould into the desired container shape and fill the so-formed container, said mandrel then opening said needle, the formed and filled container being held in the first part of said forming mould during a subsequent displacement of said transfer device which aligns said container with said sealing means; means for actuating said sealing means to close and seal the container; and means for actuating said ejecting means to remove said sealed container from said forming mould in response to a subsequent displacement of said transfer device which also places the first part of the next plastic receiving mould opposite said plastic material injection means.

2. An apparatus as claimed in claim 1, in which said sterile means for injecting said fluid further comprises three assemblies telescopically mounted with respect to each other, the first assembly carrying said head, the second asembly carrying said hollow needle displaceable between a retracted position and a forward position, for which it is located inside said forming mould, and the third assembly carrying said mandrel displaceable between two positions, the one for which it closes the said needle and the other for which it is in retracted position, opening the hollow needle, and in which said sterile means comprises a passage connecting the inside of said assemblies to the atmosphere, in order to enable the driving out and the suction of air during the relative movements of the three assemblies, this passage being provided with a filter to prevent and contamination of the sterile means due to the intake of air, the whole being arranged so as to be a separately sterilizable unit after being mounted.

3. An apparatus as claimed in claim 2 in which the sealing means comprises clamping means for maintaining and cooling the neck of the container during sealing thereof, another axially displaceable head provided with a print heated by means of a heating body for setting the material of the upper part of the container neck in fusion and for shaping and sealing said neck.

4. An apparatus as claimed in claim 3 in which said print is composed of a material on which the fused plastic material does not stick.

5. An apparatus as claimed in claim 4 in which said print is composed of sapphire.

6. An apparatus as claimed in claim 1, in which the sealing means comprises clamping means for maintaining and cooling the neck of the container during sealing thereof, a hot air injection nozzle having a shape of which is such that the hot air surface presents a general conical shape with an axis which is coincident with the axis of the neck of the container and with an apex which is located in the vicinity of the extremity of said neck, and punch means axially displaceable with respect to the nozzle for sealing and shaping the extremity of the neck of the container, the material of which has been set in a fused state by the hot air surface.

7. An apparatus as claimed in claim 1, in which the fluid injection means comprises further a pump for the fluid to be injected comprising a suction and backing piston and a jack provided with a pressure release device, said jack actuating said piston.

8. An apparatus as claimed in claim 7 in which the pressure release device comprises a piston, the stroke of which is adjustable, forcing during its displacement a predetermined quantity of fluid into said jack so as to return the suction and backing piston to its rest position.

9. An apparatus as claimed in claim 8, in which said jack apparatus is fed with fluid under pressure through a flow rate meter which adjusts the duration of the injection of the fluid.

10. An apparatus as claimed in claim 1, in which said first part of said forming mould has a first half mounted rigidly on said transfer device and a second half, and comprising means for pivotally mounting said second half upon said transfer device.

11. An apparatus as claimed in claim 10, in which the forming mould has a bottom which includes at least a portion that is axially displaceable, and spring means for subjecting said portion to an elastic force.

References Cited by the Examiner
UNITED STATES PATENTS 3,016,669  1/62  Grosclaude _____ 53—191

TRAVIS S. MCGEHEE, *Primary Examiner.*
BROMLEY SEELEY, FRANK E. BAILEY, *Examiners.*